April 22, 1958     R. G. PAGE     2,831,935

COMBINATION CIRCUIT BREAKER AND MOTOR STARTER

Filed July 11, 1955

INVENTOR.
Robert G. Page
BY Martin Kalikow

United States Patent Office

2,831,935
Patented Apr. 22, 1958

2,831,935

COMBINATION CIRCUIT BREAKER AND MOTOR STARTER

Robert G. Page, New Britain, Conn., assignor to General Electric Company, a corporation of New York Application July 11, 1955, Serial No. 521,065

4 Claims. (Cl. 200—88)

My invention relates to manually operable circuit interrupters which are also automatically operable to open the circuit upon the occurrence of short-circuit or overload conditions.

In the past, two different types of such circuit interrupting devices have been required in connection with the use of devices such as electric motors, etc., namely, a "motor starter" for controlling and protecting the motor itself and, usually in series therewith, a "circuit breaker" for switching and protecting the wiring leading to the motor.

"Circuit breakers" are characterized by an ability to operate quickly upon the occurrence of short-circuit conditions and to interrupt such short-circuit currents. "Motor starters" are characterized by being automatically operable at relatively low current values and by being adjustable in relatively fine steps to protect a motor of any one of a large number of ratings within a given range. Heretofore no single device has been provided to perform both types of functions. Among the reasons for this is the fact that in order to provide the sensitivity and fine adjustment necessary for a motor starter, it is usually necessary to utilize an indirectly heated bimetallic strip in combination with a grid of resistance wire which serves as a heater therefor. Such devices are inherently slow acting and would be destroyed by a short-circuit current if a circuit breaker or fuse were not used in series therewith.

It is an object of my invention to provide an improved automatic circuit interrupter which is capable of performing both the function of protecting electrical wiring from short-circuit conditions and the function of protecting electrical devices from overheating. While my improved device is thus capable of functioning both as a circuit breaker and, in addition, as a motor starter, the term "circuit breaker" will be used herein for convenience.

Another object of my invention is the provision of an electric circuit breaker having current-responsive means readily adaptable to various ratings.

Another object of my invention is the provision of an electric circuit breaker having current-responsive means of the magnetic type, a major portion of which may be readily removed and replaced to change the rating of the circuit breaker, the said portion being provided with plug-in mounting means for this purpose.

Another object of my invention is the provision of an electric circuit breaker having a thermally and magnetically current-responsive means which is interchangeable as a unit and in which a predetermined relationship is always assured between said thermally and magnetically responsive means.

Another object of my invention is the provision of an electric circuit breaker having current-responsive means capable of being altered or adjusted upon removal from the circuit breaker and then re-inserted, whereby to adapt the breaker to various current requirements.

In accordance with my invention in one form, I provide an electric circuit breaker of the type having a member movable in a direction to cause automatic opening of the circuit breaker, thermally-operable means for causing movement of said member in said direction, magnetically operable means for causing similar movement of said member in said direction, and a unitary plug-in mountable trip-energizing element having thereon elements for energizing said thermally and magnetically operable means and adapted to be connected electrically in circuit with said circuit breaker when in mounted position, and being readily replaceable, whereby the rating of said thermally operable and said magnetically operable means may be simultaneously altered.

The construction, organization and operation of my invention will be more fully understood by reference to the following detailed description and the accompanying drawing, and its scope will be particularly pointed out in the appended claims.

In the accompanying drawing, one embodiment of my invention and the various component parts thereof have been shown in the following figures.

Figure 1:
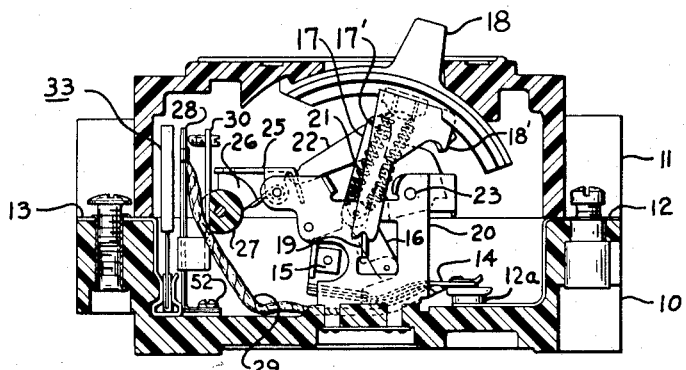
Figure 1 is a side elevation view and longitudinal section of a circuit breaker incorporating my invention.
Figure 2:
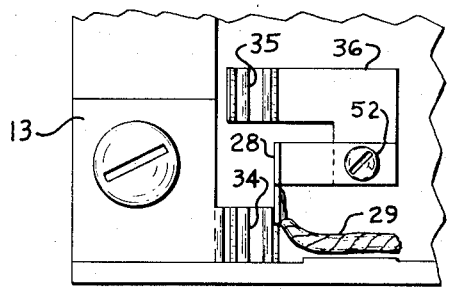
Figure 2 is a top plan view of a portion of the circuit breaker of Figure 1.
Figure 5:
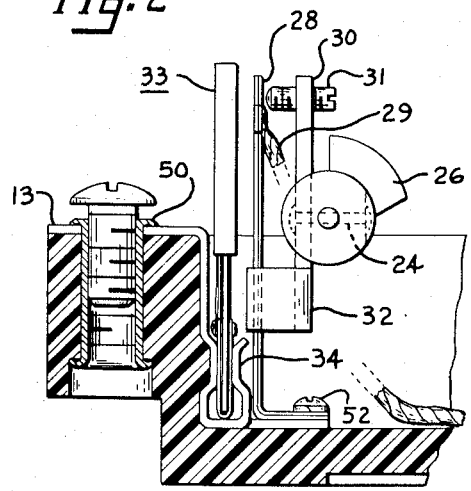
Figure 5 is an enlarged fragmentary side elevation view of the circuit breaker of Figure 1.

The circuit breaker operating mechanism may be of any suitable type. For convenience, I have shown my invention as used in a circuit breaker having an operating mechanism similar to that shown and described in Patent 2,455,753 issued December 7, 1948, to B. E. Getchell and assigned to the same assignee as the present invention, and including an insulating housing comprising a base 10 and a cover 11. The base 10 has line terminal 12 carrying a stationary contact 12a thereon, and a load terminal 13. The operating mechanism includes a movable contact arm 14 rigidly attached to a cross arm 15 which, in turn, is pivotally supported at its ends in bearings carried by suitable supporting brackets (not shown) mounted on the insulating base 10. The contact arm 14 is adapted to be manually operated between an open position in which it is out of contact with stationary contact 12a, and a closed position in which it is in contact with stationary contact 12a, by mechanism including a pair of toggle links 16 and 17. The toggle links 16 and 17 are adapted to move between a straightened condition corresponding to said closed position, and a collapsed condition corresponding to said open position, by means of a handle member 18, pivotally supported on lugs 19 of a U-shaped frame member 20, and connected to the knee of the toggle linkage by tension springs 21.

In order to move the contact arm 14 to open position automatically upon the occurrence of predetermined current conditions, member 22, which carries the pivot 17' of the upper toggle link 17, is provided, pivoted on a pin 23 journalled in the sides of frame 20, and releasably held in the position indicated in Figure 1 by a generally L-shaped intermediate latch member 25, also pivotally supported between the sides of the frame member 20. The intermediate latch member 25 in turn engages a latch surface 26 carried by a rotatable trip member 27, and is provided with an aperture into which the latch surface 26 is adapted to move upon a predetermined amount of clockwise rotation of the trip member 27. When this occurs, the intermediate latch member 25 releases member 22 which rotates clockwise about its pivot 23 carrying the toggle linkage upwardly and permitting collapse thereof and causing automatic opening of the contacts. Resetting of the member 22 following such an automatic opening operation is accomplished by moving the handle 18 counterclockwise to the extreme "off" position, during which movement a portion 18' of the handle engages the trip member 22 and rotates it counterclockwise until it is again held by the intermediate latch member 25.

The trip bar 27 is rotated in a releasing direction upon the occurrence of predetermined current conditions by combined thermal and magnetic means, including a thermally responsive bimetallic strip 28 having one end rigidly attached to the base 10 and having its other end electrically connected to the movable contact member by means including a flexible braid 29. The trip bar 27 carries an operating arm 30 attached thereto by suitable means such as by rivet 24 and having an upper portion carrying an adjustable calibrating screw 31 and a lower portion carrying a magnetic armature 32.

Figure 3:
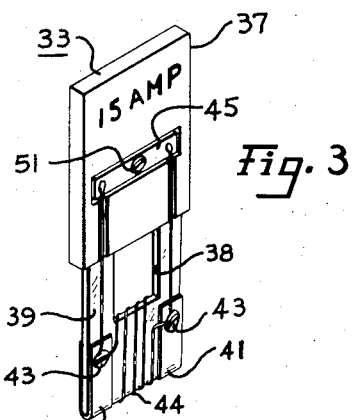
Figure 3 is a perspective view on an enlarged scale of a portion of the trip mechanism of the circuit breaker of Figure 1.
Figure 4:
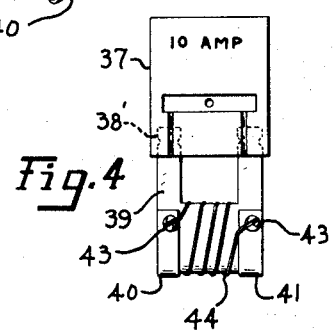
Figure 4 is a front elevation view of a portion of the trip mechanism similar to that of Figure 3, but of a different rating.

The current responsive device is energized both thermally and magnetically, by a removable trip-energizing assembly, indicated generally at 33, and illustrated particularly in Figures 3 and 4 and adapted to be received and held in contact jaws 34 and 35, whereby it is connected electrically in series with the bimetal 28 and the load terminal 13. Contact jaw 34 is preferably made integral with the load terminal 13 which is rigidly attached to the base 10 by a spun-over tubular rivet 50. Contact jaws 35 are preferably carried by strap 36 which is mounted in common with the fixed end of the bimetallic strip 28 to the base 10 by means of screw 52.

The trip-energizing assembly 33 comprises a generally rectangular insulating support 37 and a generally U-shaped flat magnetic core 38 having portions 38' embedded in the support 37. The lower portion of the core 38 is preferably insulated by suitable heat-resistant insulating means such as mica 39, which serves to insulate contacts 40 and 41 therefrom. The contacts 40, 41 comprise U-shaped strips of thin conductive material attached to the core 38 by suitable means such as by screws 43. Screws 43 are insulated from the core 38, which is provided with enlarged openings (not shown) at such locations. The core 38 is also provided with an energizing heater coil 44 which has its ends connected to the contact surfaces 40 and 41, respectively, and which is likewise insulated from the core 38 by the mica 39. For the purpose of varying the heating effect of the coil 44 I provide a replaceable shunting shim 45 which is mounted on the insulating support 37 by means of screw 51 and which is electrically connected to the terminals 40 and 41. The assembly 33 is adapted to be plug-in mounted in the circuit breaker by engagement of the contact portions 40 and 41 in the contact jaws 34 and 35, respectively.

When the assembly 33 is in mounted position, the current path through the circuit breaker may be traced from load terminal 13 through the contact jaws 34 to the contact surface 40 and thence in electrically parallel paths one through the coil 44 and one through the resistance shim 45 to the contact surface 41 to the contact jaws 35 to the fixed end of the bimetallic strip 28, through the bimetallic strip 28 to the flexible braid 29 and thence to the movable contact.

The mounted position of the assembly 33 is such as to place the heater coil 44 in close proximity to the bimetallic strip 28. The heating effect of the current passing through the bimetallic strip 28 is therefore increased by the heating effect of the heating coil 44. It will be understood that, if desired, I may utilize the bimetallic strip while nevertheless omitting it from the electrical circuit, by connecting the flexible braid between contact arm 14 and the fixed end of the bimetallic strip 28. The heating effect of the coil 44 operates in the same manner as previously described to cause deflection of the bimetallic strip and operation of the circuit breaker.

If it is desired to alter the heating effect of the coil 44 in order to tailor the rating of the device to various sizes of electric motors or other devices, the shunting strip 45 may be replaced with a similar strip of different electric resistivity or the shunt may be omitted altogether, as illustrated in Figure 4. By this means, fine adjustment is possible within a given range. The range itself may be changed by replacing the assembly 33 with a similarly dimensioned assembly having different electrical characteristics.

While the coil 44 serves as a heater to assist the thermal warping of the bimetallic strip 28 and may in fact be used only for this purpose (in which case the core 38 may be made of a non-magnetic material), I prefer to make the core member 28 of ferro-magnetic material such that the coil 44 serves to energize the core 38 and to create magnetic poles therein at portions immediately above contact portions 40 and 41. By this means, a magnetic field is created which on the occurrence of a sudden high overload of "short-circuit" proportion, attracts armature 32 and rotates trip bar 27 to cause automatic opening of the circuit breaker. The core member 38 and coil member 44 in a given assembly preferably bear a particular desirable predetermined relation to each other. Thus when a larger heating coil 44 is used, it is ordinarily desirable to use a magnetic member requiring higher currents to actuate it. Conversely, when a heater coil 44 is used of low ampere capacity it is desirable that a magnetic current-responsive means be used in conjunction therewith which also is responsive to lower current values. By the integral and interchangeable assembly illustrated, I assure that the magnetic tripping means will be suitably altered at any time when the thermal responsive means is altered.

For devices of relatively low normal current rating, such, for instance, as 2 or 3 amperes normal current, I provide a trip-energizing assembly 33 having a heater coil 44 of relatively fine wire, and with a relatively large number of turns. I also provide such assembly with a magnetic core 38 of relatively great thickness and high permeability. It will be observed that the provision of a relatively large number of turns in the heater coil 44 also enables the magnetic current-responsive means to operate at a relatively low value, and that the use of a relatively thick core 38 also reduces the air gap between the core 38 and the poles 32.

For devices of relatively high normal current rating, I provide a trip-energizing assembly 33 having a heater coil 44 of relatively heavy wire and with relatively few turns. I also provide such assembly with a magnetic core 38 that is relatively thin and of relatively low permeability. It will be observed here that decreasing the number of turns of the heater 44 causes the magnetic current-responsive means to require a higher current to actuate it, and that decreasing the thickness of the core not only increases its reluctance but also increases the air gap between the core and the poles 32.

Reference is made to copending application of William A. Thomas, Serial Number 706,679, filed January 2, 1958, and assigned to the same assignee as the present application. The invention of the said Thomas application was made by said William A. Thomas prior to my present invention and I, therefore, do not claim herein anything shown or described in said Thomas application.

While I have shown and described a preferred embodiment of my invention, it is to be understood that various changes and modifications in the details of the construction may be made without departing from the spirit of my invention and I, therefore, intend to cover all such modifications and changes as fall within the true spirit and scope of my invention as set forth in the appended claims.

What I claim as new and desire to secure by Letters Patent of the United States is:

1. An electric circuit interrupter comprising an insulating casing and at least two relatively movable main contacts mounted therein, a trip member mounted in said insulating casing and movable to cause automatic opening of said main contacts, thermally responsive means supported in said insulating casing for moving said movable member, a magnetic armature member supported in said insulating casing for moving said movable member, a pair of relatively stationary contacts mounted in said insulating casing, a unitary trip energizing assembly comprising a relatively rigid supporting member having a pair of contact surfaces for contacting said relatively stationary contacts respectively, resilient means for frictionally maintaining such contacts in engagement without the use of positive retaining means whereby said assembly may be mounted in said interrupter casing by a plug-in action, said assembly having electrical energizing means connected between said contact surfaces for heating said thermally responsive means and for moving said armature member.

2. An electric circuit interrupter comprising at least two relatively movable contacts, a trip member releasable to cause automatic opening of said contacts, means movable to cause release of said releasable means including a thermally-warpable bimetallic strip member and an electromagnetically actuable member, and a unitary removably mounted trip-energizing assembly including a magnetic core member and a heater coil electrically connected in circuit with said contats to heat said thermally warpable member, said heater coil being wound around said magnetic core member whereby said electromagnetic core member may be energized by current passing through said heater coil to attract and actuate said electromagnetically actuable member.

3. An electric circuit interrupter comprising at least two relatively movable contacts, a trip member releasable to cause automatic opening of said contacts, means movable to cause release of said releasable means including a thermally-warpable bimetallic strip member and electromagnetically actuable member, and a unitary removably mounted trip-energizing assembly including an electromagnetic core member, a heater coil wound about said electromagnetic core member, a pair of contacts carried by said electromagnetic core member and insulated therefrom, said heater coil having its ends connected to each of said contacts respectively, cooperating contacts in said circuit interrupter adapted to receive said heater coil contacts by a plug-in engagement, said heater coil being connected electrically in circuit with said relatively movable contacts when in mounted position and operating to heat said thermally warpable member, said electromagnetic core member being adapted to be energized by current flowing through said heater coil to attract and actuate said electromagnetically actuable member.

4. An electric circuit interrupter comprising at least two relatively movable contacts, a trip member releasable to cause automatic openings of said contacts, means movable to cause release of said releasable means including a thermally-warpable bimetallic strip member and an electromagnetically actuable member, and an unitary removably mounted trip-energizing assembly including means electrically connected in series with said contacts to energize said electromagnet and to heat said thermally warpable member said means comprising an electromagnetic core member and a heater coil wound about said core member said heater coil having contacts in engagement with cooperating contacts in said circuit interrupter terminals, means electrically connected to the respective ends of said heater coil and carried by said trip-energizing assembly and adapted to receive electrical conduction means in shunting relation to said heater coil to modify the electrical characteristics thereof.

References Cited in the file of this patent

UNITED STATES PATENTS

| | | |
|---|---|---|
| 1,772,442 | Hanny | Aug. 5, 1930 |
| 2,076,136 | Weed | Apr. 6, 1937 |
| 2,367,382 | Taylor | Jan. 16, 1945 |
| 2,422,508 | Von Hoorn | June 17, 1947 |
| 2,433,720 | Van Valkenburg | Dec. 30, 1947 |
| 2,439,069 | Anderson | Apr. 6, 1948 |
| 2,584,673 | Cole | Feb. 5, 1952 |
| 2,618,720 | Besag et al. | Nov. 18, 1952 |
| 2,662,951 | Boller et al. | Dec. 15, 1953 |
| 2,629,796 | Kern | Feb. 24, 1953 |